United States Patent
Zheng (10) Patent No.: US 9,554,009 B2
(45) Date of Patent: Jan. 24, 2017

(54) IMAGE SCANNING APPARATUS CONFIGURED WITH A DC VOLTAGE POWER SOURCE

(71) Applicant: BROTHER KOGYO KABUSHIKI KAISHA, Nagoya-shi, Aichi-ken (JP)

(72) Inventor: Jie Zheng, Aichi (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/952,220

(22) Filed: Nov. 25, 2015

(65) Prior Publication Data
US 2016/0156800 A1 Jun. 2, 2016

(30) Foreign Application Priority Data
Nov. 28, 2014 (JP) .................. 2014-241003

(51) Int. Cl.
| | |
|---|---|
| *H04N 1/401* | (2006.01) |
| *H04N 1/00* | (2006.01) |
| *H04N 1/028* | (2006.01) |
| *H04N 1/60* | (2006.01) |

(52) U.S. Cl.
CPC ...... *H04N 1/00994* (2013.01); *H04N 1/00005* (2013.01); *H04N 1/00018* (2013.01); *H04N 1/00068* (2013.01); *H04N 1/00082* (2013.01); *H04N 1/00904* (2013.01); *H04N 1/02815* (2013.01); *H04N 1/60* (2013.01)

(58) Field of Classification Search
USPC .................. 358/504, 406, 461, 463, 474
See application file for complete search history.

(56) References Cited

U.S. PATENT DOCUMENTS

| | | | | |
|---|---|---|---|---|
| 2004/0008387 A1* | 1/2004 | Ikeno | .................. | H04N 1/0402 358/505 |
| 2009/0033808 A1* | 2/2009 | Maeda | .................. | G03B 33/06 348/756 |

FOREIGN PATENT DOCUMENTS

| | | |
|---|---|---|
| JP | 2003-143343 A | 5/2003 |
| JP | 2004-165870 A | 6/2004 |
| JP | 2005-348340 A | 12/2005 |

* cited by examiner

*Primary Examiner* — Marcellus Augustin
(74) *Attorney, Agent, or Firm* — Merchant & Gould P.C.

(57) ABSTRACT

An image scanning apparatus has a scanner configured to read an original sheet on a line basis at a constant line cycle and generate analog image data for each pixel of the line, and output the analog image data for each pixel at a pixel cycle, a power source including a DC/DC converter configured to convert a first DC voltage to a second DC voltage by applying a switching control to the first DC voltage at a switching cycle, the second DC voltage being supplied to the scanner, a convertor configured to sample the analog image data at the pixel cycle to convert the analog image data to digital image data, a sampling setting unit configured to set the pixel cycle, and a controller configured to cause the sampling setting unit to set the pixel cycle to be an integer multiple of the switching cycle of the DC/DC convertor.

9 Claims, 8 Drawing Sheets

IMAGE SCANNING APPARATUS CONFIGURED WITH A DC VOLTAGE POWER SOURCE

CROSS-REFERENCE TO RELATED APPLICATION

This application claims priority under 35 U.S.C. §119 from Japanese Patent Application No. 2014-241003 filed on Nov. 28, 2014. The entire subject matter of the application is incorporated herein by reference.

BACKGROUND

Technical Field

The present disclosures relate to an image scanning apparatus.

Related Art

Conventionally, it is known that image scanning apparatuses have a following problem. That is, due to fluctuation in an output voltage of a power supply which is applied to a scanning device of the scanning apparatus, noises may be included in a read signal generated by the scanning device. For example, a DC power supply noise component due to a ripple voltage which is generated due to a ripple voltage in the power supply of the scanning device may be superposed on the read signal.

SUMMARY

There is known a conventional scanning apparatus which is configured to extract a noise component superposed on the read signal, and removes the same by subtracting the extracted noise component from the read signal.

In such a technique, however, if photoelectric conversion elements inside the scanning device output an electrical signal as the read signal upon starting outputting the electrical signal, the color of the light source cannot be switched one having a different color until all the read signal has been output. According to a recent configuration, analog memories corresponding to the respective photoelectric conversion elements are provided inside the scanning device. Then, immediately after reading an image for one line, the electrical signal for one line is stored in the analog memory, so that a light control to switch the light sources can be performed.

Since the electric signal for a previous line is output from the scanning device having the built-in analog memory as the read signal, the noise component in the read signal and the noise component of the power source are different by one line. Therefore, in the conventional image scanning apparatus as mentioned above, it is necessary to adjust timings of the noise components of the read signal and the power source in order to remove the noise components from the read signal.

In consideration of the above, according to the present disclosures, there is provided an improved image scanning apparatus in which, even if a noise component is generated in the power source of the scanning device, the noise component does not have any influence on the read signal.

According to aspects of the disclosures, there is provided an image scanning apparatus, which has a scanner configured to read an original sheet on a line basis at a constant line cycle and generate analog image data for each pixel of the line, and output the analog image data for each pixel at a pixel cycle, a power source including a DC/DC convertor which is configured to convert a first DC voltage to a second DC voltage by applying a switching control to the first DC voltage at a switching cycle, the second DC voltage being supplied to the scanner, a convertor configured to sample the analog image data at the pixel cycle to convert the analog image data to digital image data, a sampling setting unit configured to set the pixel cycle, and a controller configured to cause the sampling setting unit to set the pixel cycle such that the pixel cycle is an integer multiple of the switching cycle of the DC/DC convertor.

Since the pixel cycle is set to the integer multiple of the switching cycle, the pixel cycle synchronizes with the switching cycle. Accordingly, fluctuation of the voltage of the power source due to a switching control is constant, and influence of the voltage fluctuation on the analog image data is removed or well suppressed.

DETAILED DESCRIPTION OF THE EMBODIMENT

Hereinafter, referring to the accompanying drawings, an image scanning apparatus 1 according to an illustrative embodiment of the disclosures and its modifications will be described.

<Mechanical Configuration of Image Scanning Apparatus>

Figure 1:
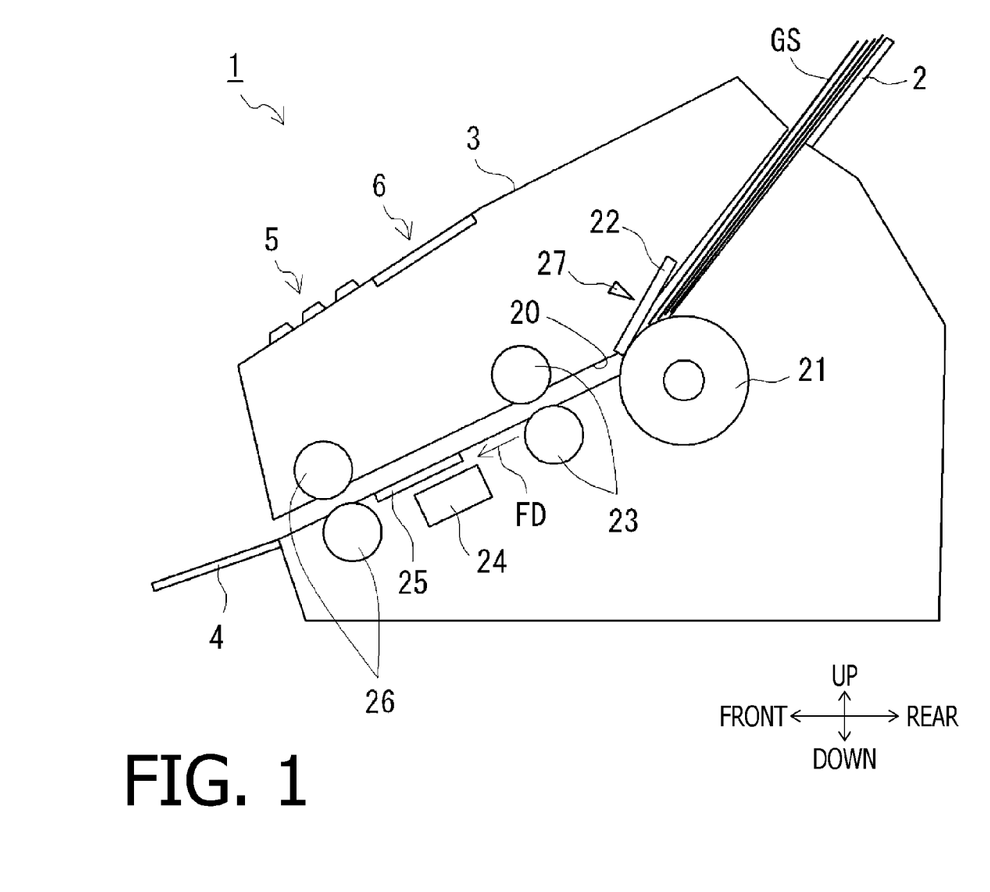
FIG. 1 schematically shows an inner structure of an image scanning apparatus viewed from a front side according to an illustrative embodiment of the disclosures.

In FIG. 1, up, down, front and rear directions are indicated by arrows. The image scanning device 1 has a sheet feed tray 2, a main body 3, and a discharge tray 4. Further, the image scanning device 1 has an operation panel 5 and a display 6, which are arranged on an upper surface of the main body 3. The operation panel 5 is provided with a power switch and other setting buttons through which a user can input operational commands and the like. For example, the operation panel 5 is provided with a selection button to select three-color mode (color mode) or single-color mode (mono mode), an operation button to set a resolution, and the like. The display 6 is provided with an LCD (liquid crystal display) and displays operational statuses of the image scanning apparatus 1.

A sheet conveying passage 20 is defined inside the main body 3. Each of original sheets GS placed on the sheet feed tray 2 is conveyed, along the sheet conveying passage D, in a conveying direction FD, and discharged from the main body 3 onto the discharge tray 4. A sheet feed roller 21, a sheet separation pad 22, an upstream conveying roller pair 23, a scanner 24, a platen glass 25, a downstream conveying roller pair 26 are arranged along the sheet conveying passage 20.

The sheet feed roller 21 feeds, in association with the sheet separation pad 22, multiple original sheets GS placed on the sheet feed tray 2 one by one. The upstream conveying roller 23 and the downstream conveying roller 26 are driven by a conveying motor MT (see FIG. 4). The platen glass 25 has light transmissivity, and arranged below and along the sheet conveying passage 20. The conveying roller pairs 23 and 26 are configured to convey the original sheet GS fed by the sheet feed roller 21 to pass over the platen glass 25.

According to the illustrative embodiment, the original sheets GS are to be placed on the sheet feed tray 2 such that scan surfaces of the original sheets GS face an original placement surface of the sheet feed tray 2. The scanner 24 is arranged below the sheet conveying passage 20, and is configured to scan an image on the scanned surface of each original sheet GS passes over the platen glass 25. It is noted that an original sheet sensor 27 is provided to the sheet feed tray 2 such that the original sheet sensor 27 is turned ON when the original sheets GS are placed on the sheet feed tray 2, while turned OFF when no original sheet GS is placed on the sheet feed tray 2.

<Details of Configuration of Scanner>

Figure 2:
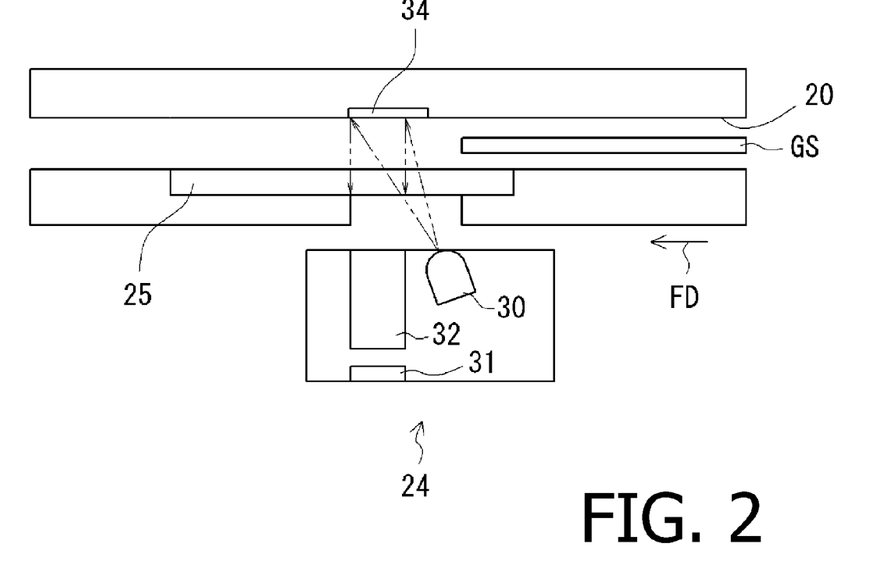
FIG. 2 is an enlarged view of a scanner employed in the image scanning apparatus according to the illustrative embodiment of the disclosures.

Referring to FIG. 2, a configuration of the scanner 24 will be described in detail. The scanner 24 has a light source 30, a light reception element 31 and an optical member 32 as shown in FIG. 2. The light source 30 includes red, green and blue light emitting diodes. Light emitted from the light source 30 is reflected by the scan surface of the original sheet GS is directed, by the optical member 32, to the light reception element 31. According to the illustrative embodiment, when the color mode is selected, one line of image on the original sheet GS is read as three-color light emitting diodes are lit sequentially. When the mono mode is selected, a particular one of the three-color light emitting diodes (e.g., the green light emitting diode) is lit to read one line of the image on the original sheet GS.

A white reference plate 34 is arranged at a position opposite to the scanner 24 with respect to the sheet conveying passage 20. That is, the white reference plate 34 faces the scanner 24 via the sheet conveying passage 20. The white reference plate 34 has a reflectance the same as that of background color (i.e., white) of the original sheet GS. When there are no original sheets GS in the sheet conveying passage 20, the light emitted from the light source 30 is reflected by the white reference plate 34. Then, the reflected light is received by the light reception element 31 via the optical member 32. According to the illustrative embodiment, the optical member 32 includes a rod lens extending in a main scanning direction MD.

The light reception element 31 includes multiple sensor IC (integrated circuit) chips which are linearly arranged in the main scanning direction MD. Each sensor IC chip includes a plurality of photoelectric conversion elements 33 arranged in the main scanning direction MD. Further, each sensor IC chip includes a shift register and an amplifier (not shown). Each photoelectric conversion element 33 is an element corresponding to one pixel of image data.

<Electrical Configuration of Image Scanning Apparatus>

Figure 3:
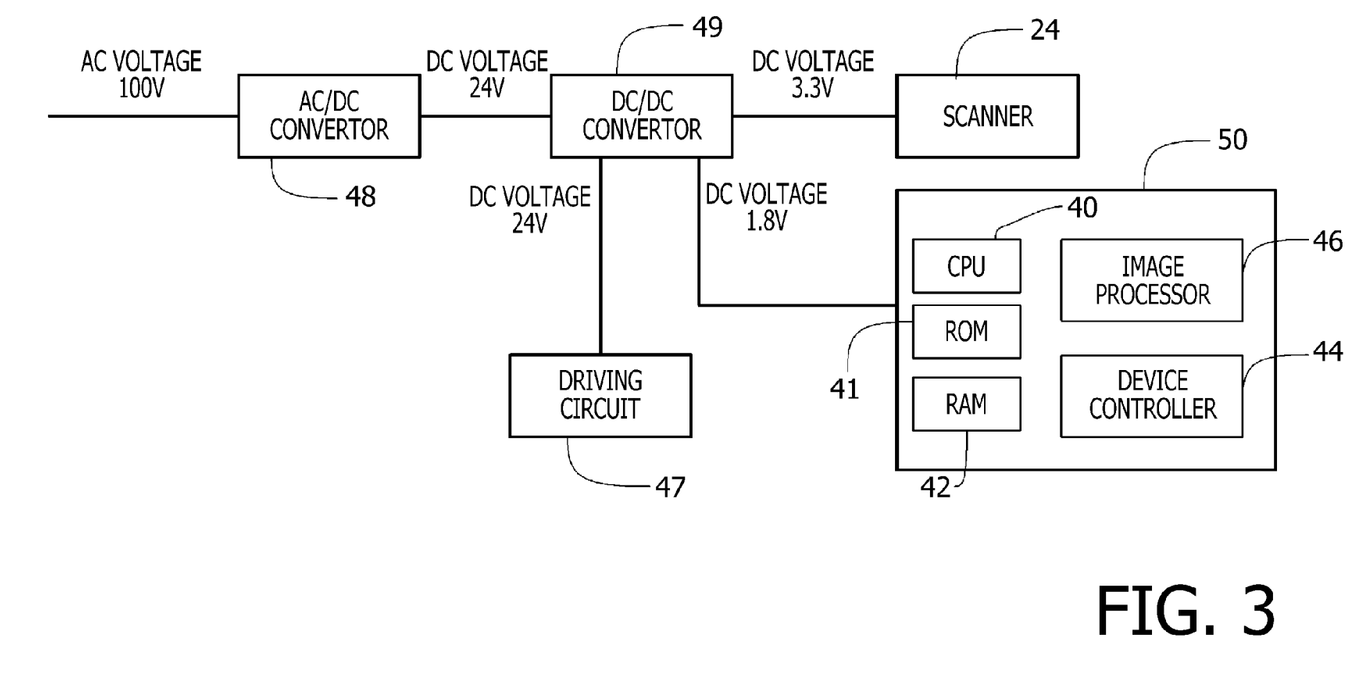
FIG. 3 is a block diagram showing a power supply configuration of the image scanning apparatus according to the illustrative embodiment of the disclosures.
Figure 4:
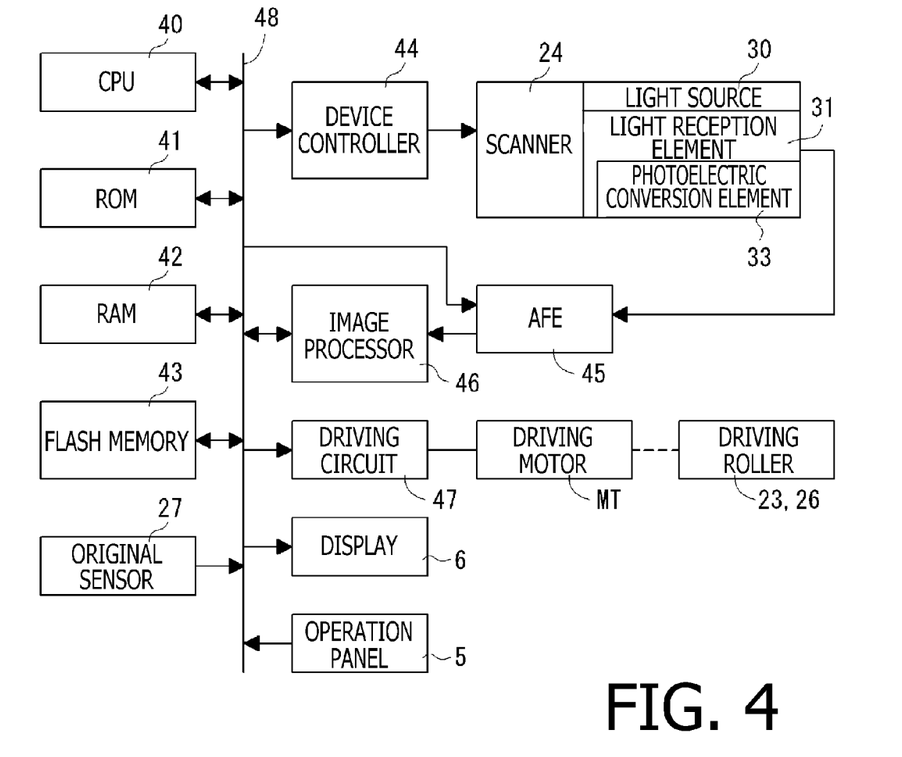
FIG. 4 is a block diagram showing an electrical configuration of the image scanning apparatus according to the illustrative embodiment of the disclosures.

Referring to FIGS. 3 and 4, an electrical configuration of the image scanning apparatus 1 will be described. As shown in FIG. 3, the image scanning apparatus 1 has an AC/DC convertor 48, a DC/DC convertor 49, a driving circuit 47, the scanner 24 and a controller 50. Among such components, the AC/DC convertor 48 and the DC/DC convertor 49 are convertors that convert voltages, and supply different voltages to the driving circuit 47, the scanner 24 and the controller 50. The controller 50 has a CPU (central processing unit) 40, a ROM (read only memory) 41, a RAM (random access memory) 42, a device controller 44 and an image processor 46, and controls operations of the image scanning apparatus 1. Controlling of the operations by the controller 50 will be described in detail later.

The AC/DC convertor 48 converts an AC voltage of 100V into a DC voltage of 24V, and applies the converted DC voltage to the DC/DC convertor 49. According to the illustrative embodiment, the AC/DC convertor 48 employs a diode bridge and well-known circuits such as an integration circuit, and converts the AC voltage of 100V to the DC voltage of 24V.

The DC/DC convertor 49 applies a PWM (pulse width modulation) control to the DC voltage of 24V supplied from the AC/DC circuit 48 in accordance with a PWM setting value, and integrates the output of the AC/DC circuit 48 with an integration circuit to generate a necessary DC voltage. For example, a DC voltage 3.3V to be applied to the scanner 24 is generated by applying the PWM control to the DC voltage of 24V with the conduction rate of 13.75% (=3.3V/24V). A DC voltage of 1.8V to be applied to the controller 50, and the DC voltage of 24V for the driving circuit 47 is generated similarly by applying the PWM control. One interval in the PWM control of the DC/DC convertor 49 is a switching cycle.

As shown in FIG. 4, the image scanning apparatus 1 has a CPU 40, a ROM 41, a RAM 42, a flash PROM (programmable ROM) 43, a device controller 44, an analog front end (hereinafter, abbreviated as AFE) 45, an image processor 46 and a driving circuit 47 as parts of components thereof. These components are connected to the operation panel 5, the display 6 and an original sheet sensor 27 via a bus 48.

The ROM 41 stores programs for executing a maintenance main process, a scanning main process, which will be described later, subroutines called in respective main processes, and the like to control operations of the image scanning apparatus 1. The CPU 40 controls the components of the image scanning apparatus 1 in accordance with the programs retrieved from the ROM 41. The flash ROM 43 is a rewritable non-volatile memory and stores pieces of data which are output when the CPU 40 executes controlling of the components of the image scanning apparatus 1. Such data includes black data BK and white data WH which are obtained in the maintenance main process. The RAM 42 temporarily stores calculation results generated in controlling processes of the CPU 40.

The device controller 44 is connected to the scanner 24, and transmits a signal to control turning ON/OFF of the light source 30, and a signal to control an electrical current value flowing through the light source 30 to the scanner 24. Further, the device controller 44 transmits a clock signal CLK and a serial in signal SI to the light reception element 31 so that the multiple photoelectric conversion elements 33 of the sensor IC chip are sequentially driven. The clock single CLK represents timings to drive the photoelectric conversion elements 33 on pixel basis, and a line cycle signal. When the scanner 24 receives a lighting control signal from the device controller 44, the scanner 24 turns on the light source 30 and transmits an analog signal corresponding to the amount of light received by the light reception element 31 to the AFE 45.

The AFE 45 is connected to the scanner 24, and converts the analog signal transmitted from the scanner 24 to a digital signal at a sampling timing for each pixel, which sampling timing is determined by a sampling value that is set in accordance with a command from the CPU 40. The AFE 45 has a particular input range and a particular resolution which are determined in advance. For example, the resolution is represented by gradation value from "0" to "1023" for 10 bits. In this case, the AFE 45 converts the analog signal transmitted from the scanner 24 to the digital signal representing a 10-bit (i.e., 0-1023) digital image data. The digital image data converted by the AFE 45 is transmitted to the image processor 46.

The image processor 46 includes an ASIC (application specific integrated circuit) that is an IC (integrated circuit) dedicated to an image processing, which applies various image processing operations to the digital image data. The image processing operations include compensation processes such as a shading compensation process, and a resolution conversion process. The image processor 46 applies the shading compensation process to the digital image data based on the black data BK and the white data WH, thereby the digital image data being converted to gradation values. Further, the image processor 46 executes the resolution conversion process by outputting the gradation values in a thinned manner. The image processor 46 executes the shading compensation process and the resolution conversion process in accordance with setting values set to the image processor 46, and stores the digital image data or the gradation values in the RAM 42. It is noted that the white data WH and the black data BK used in the shading compensation are set to the image processor 46.

The driving circuit 47 is connected to the conveying motor MT, and drives the conveying motor MT in accordance with a diving command transmitted from the CPU 40. The driving circuit 47 rotates the conveying motor MT in accordance with a rotation amount and a rotation direction instructed by the driving command. When the conveying motor MT rotates a particular amount, the conveying roller pairs 23 and 26 rotate by a particular angle, thereby the original sheet GS is conveyed by a particular distance in the sheet conveying passage 20.

<Electrical Operation of Image Scanning Apparatus>

Figure 5A:
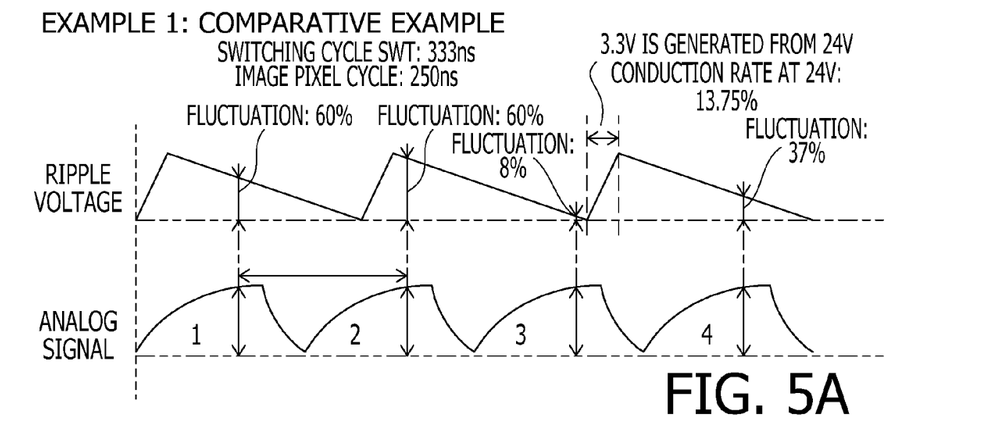
FIG. 5A shows a relationship between a ripple voltage and an analog voltage for an example 1, which is a comparative example.
Figure 5B:
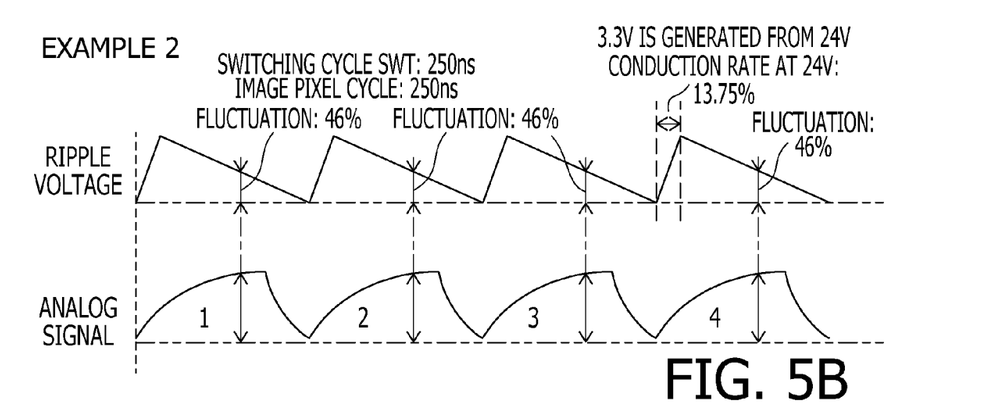
FIG. 5B shows a relationship between the ripple voltage and the analog voltage for an example 2 according to the illustrative embodiment.
Figure 5C:
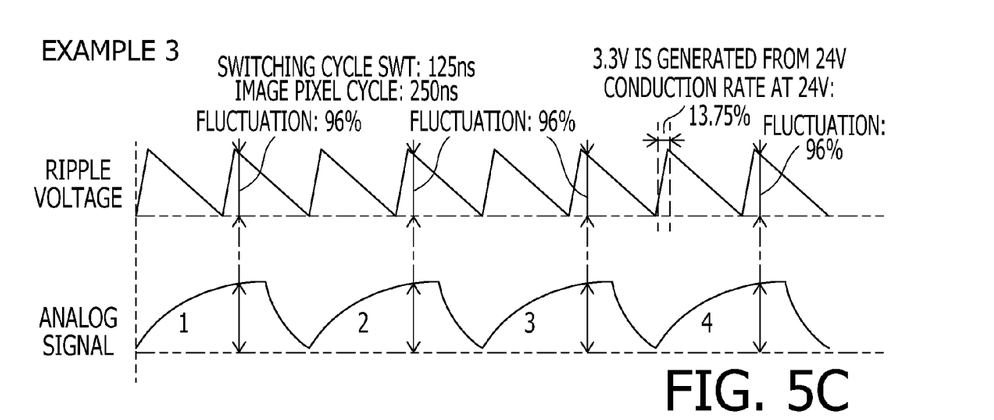
FIG. 5C shows a relationship between the ripple voltage and the analog voltage for an example 3 according to the illustrative embodiment.

Referring to FIG. 5, an electrical operation of the image scanning apparatus 1 will be described. The DC/DC convertor 49 generates a DC voltage of 3.3V as a voltage to be supplied to the scanner 24 in accordance with the PWM control as mentioned above. Therefore, on the DC voltage 3.3V, ripple voltages are superposed due to ON/OFF switching of the PWM control. The ripple voltage fluctuates in a voltage-increasing direction when the PWM control is ON, while in a voltage-decreasing direction when the PWM control is OFF. When the ripple voltage is generated in the DC voltage of 3.3V which is applied to the scanner 24, the change of the ripple voltages are superposed on the analog signal. Relationships between the ripple voltage and the analog signal will be explained referring to some design examples of the switching cycle SWT and the pixel cycle PT.

Example 1

Comparative Example

FIG. 5A shows a design example 1, which is designed such that the switching cycle SWT is 333 ns (nanoseconds) and an image pixel cycle IPT is 250 ns (nanoseconds). In the following description on FIG. 5A, the design example will be described referring to a first pixel to the fourth pixel of the analog signal.

In design example 1, the fluctuation amount of the ripple voltage at a sampling timing of the first pixel is 60%. It is noted that the fluctuation is a value calculated based on the maximum value being 100% and the minimum value being 60%. Thus, the analog signal of the first pixel is affected by 60% of the fluctuation amount due to the ripple voltage.

The sampling timing of the second pixel is after the sampling timing of the first pixel by the pixel cycle IPT. The fluctuation of the ripple voltage at the sampling timing of the second pixel is 92%. In the design example 1, the pixel cycle IPT is shorter than the switching cycle SWT by approximately 25%. As a result, at the sampling timing of the second pixel, the fluctuation of the ripple voltage is 92%. That is, the fluctuation by the 92% of the ripple voltage affects the analog signal of the second pixel.

The sampling timings for the third and fourth pixels are also after the pixel cycle IPT with respect to sampling of the previous pixel. Therefore, the fluctuation of the ripple voltage at the sampling timing for the third pixel is 8%, and the fluctuation of the ripple voltage at the sampling timing for the fourth pixel is 37%. As above, according to the design example 1, influences of the fluctuation of the ripple voltage for the multiple pixels are not constant.

Design Example 2

Referring to FIG. 5B, a case where the image scanning apparatus 1 is designed such that the switching cycle SWT is 250 ns, and the pixel cycle IPT is 250 ns will be described. Similarly to the case of the design example 1, description will be made with respect the analog signals for the first to fourth pixels.

As mentioned above, the sampling timing for the second pixel is after the sampling timing for the first pixel by the pixel cycle IPT. The fluctuation of the ripple voltage at the sampling timing for the second pixel is 46%. According to the design example 2, the pixel cycle IPT is equal to the switching cycle SWT. Therefore, according to the design example 2, the fluctuation of the ripple voltage for the first pixel and that of the second pixel are constant.

The sampling timings for the third and fourth pixels are also after the sampling timing for the previous pixel by the pixel cycle IPT. Therefore, the fluctuation of the ripple voltage at the sampling timing for the third pixel is also 46%. So is for the fourth pixel. As above, according to the design example 2, the fluctuation of the ripple voltage is constant at the sampling timing for each pixel. Therefore, the constant fluctuation of the ripple voltage influences on the analog signal.

Design Example 3

Referring to FIG. 5C, a case where the image scanning apparatus 1 is designed such that the switching cycle SWT is 125 ns, and the pixel cycle IPT is 250 ns will be described.

Similarly to the cases of the design examples 1 and 2, description will be made with respect the analog signals for the first to fourth pixels.

According to the design example 3, the fluctuation of the ripple voltage at the sampling timing of the first pixel is 96%. That is, the analog signal for the first pixel is influenced by the fluctuation of the ripple voltage of 96%.

As mentioned above, the sampling timing for the second pixel is after the sampling timing for the first pixel by the pixel cycle IPT. The fluctuation of the ripple voltage at the sampling timing for the second pixel is 96%. According to the design example 3, the pixel cycle IPT is twice the switching cycle SWT. Therefore, according to the design example 3, the fluctuation of the ripple voltage for the first pixel and that of the second pixel are constant since the pixel cycle IPT is an integer multiple of the switching cycle SWT.

The sampling timings for the third and fourth pixels are also after the sampling timing for the previous pixel by the pixel cycle IPT. Therefore, the fluctuation of the ripple voltage at the sampling timing for the third pixel is also 96%. So is for the fourth pixel. As above, according to the design example 3, the fluctuation of the ripple voltage is constant at the sampling timing for each pixel. Therefore, the constant fluctuation of the ripple voltage influences on the analog signal. It is noted that in the description of the operation of the image scanning apparatus 1 according to the illustrative embodiment, it is assumed that the image scanning apparatus 1 is configured by employing the design example 3.

It is noted that, if the switching cycle SWT is designed to be 125 ns, due to individual differences, the actual switching cycle SWT may fluctuate within a range between −10% and +10%. That is, the actual switching cycle SWT may fluctuate within a range from 112.5 ns to 137.5 ns. Therefore, unless the switching cycle SWT is multiple integer of the pixel cycle PT, the fluctuation of the ripple voltage may not be constant for respective pixels. In order to overcome this problem, as described later, a line cycle determining process (R2, M2) should be done. With this process, the fluctuation of the ripple voltage within one line can be made constant for respective pixels within the line.

Operation According to Illustrative Embodiment

Figure 6:
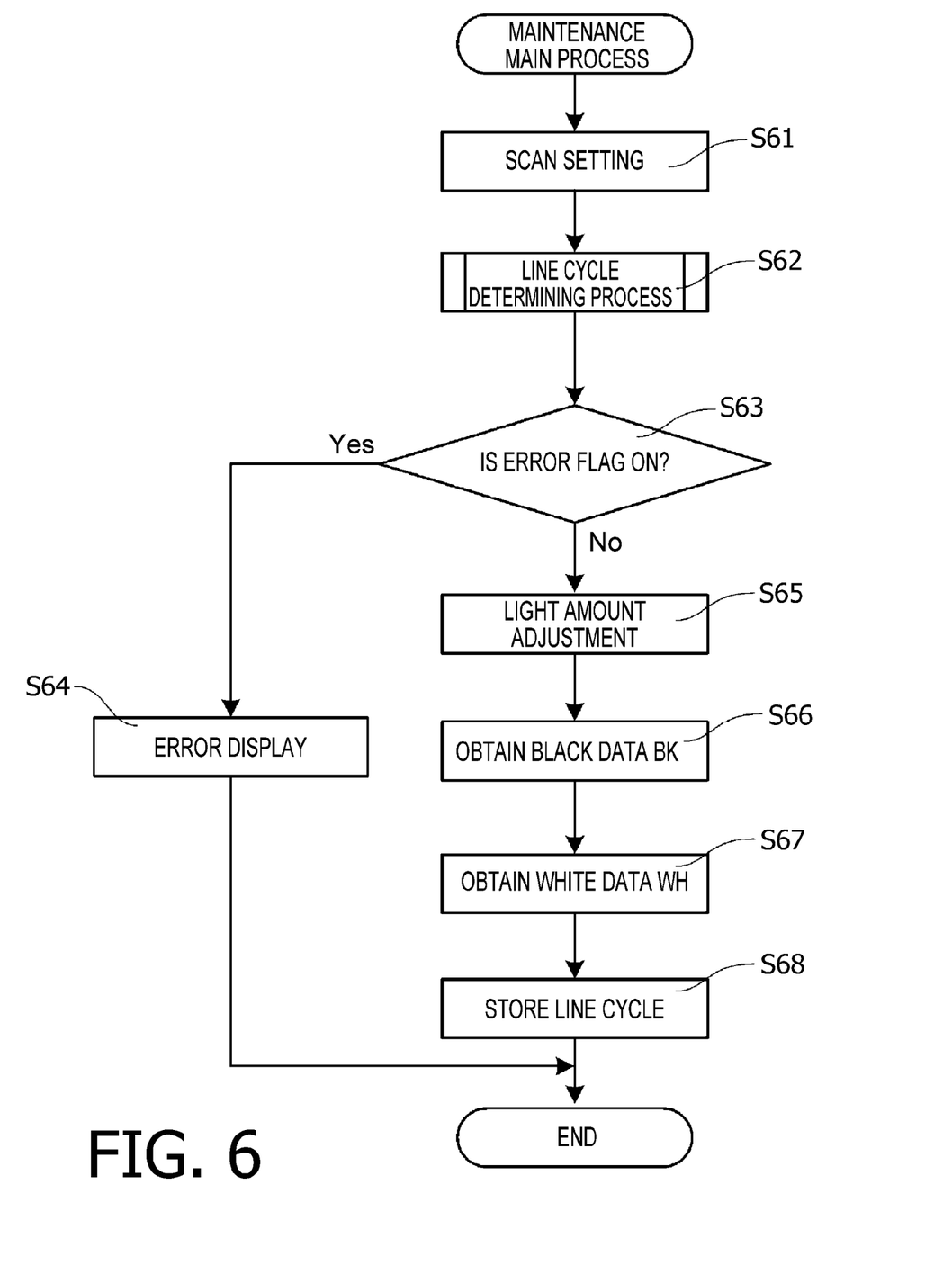
FIG. 6 is a flowchart illustrating a maintenance main process according to the illustrative embodiment of the disclosures.
Figure 7:
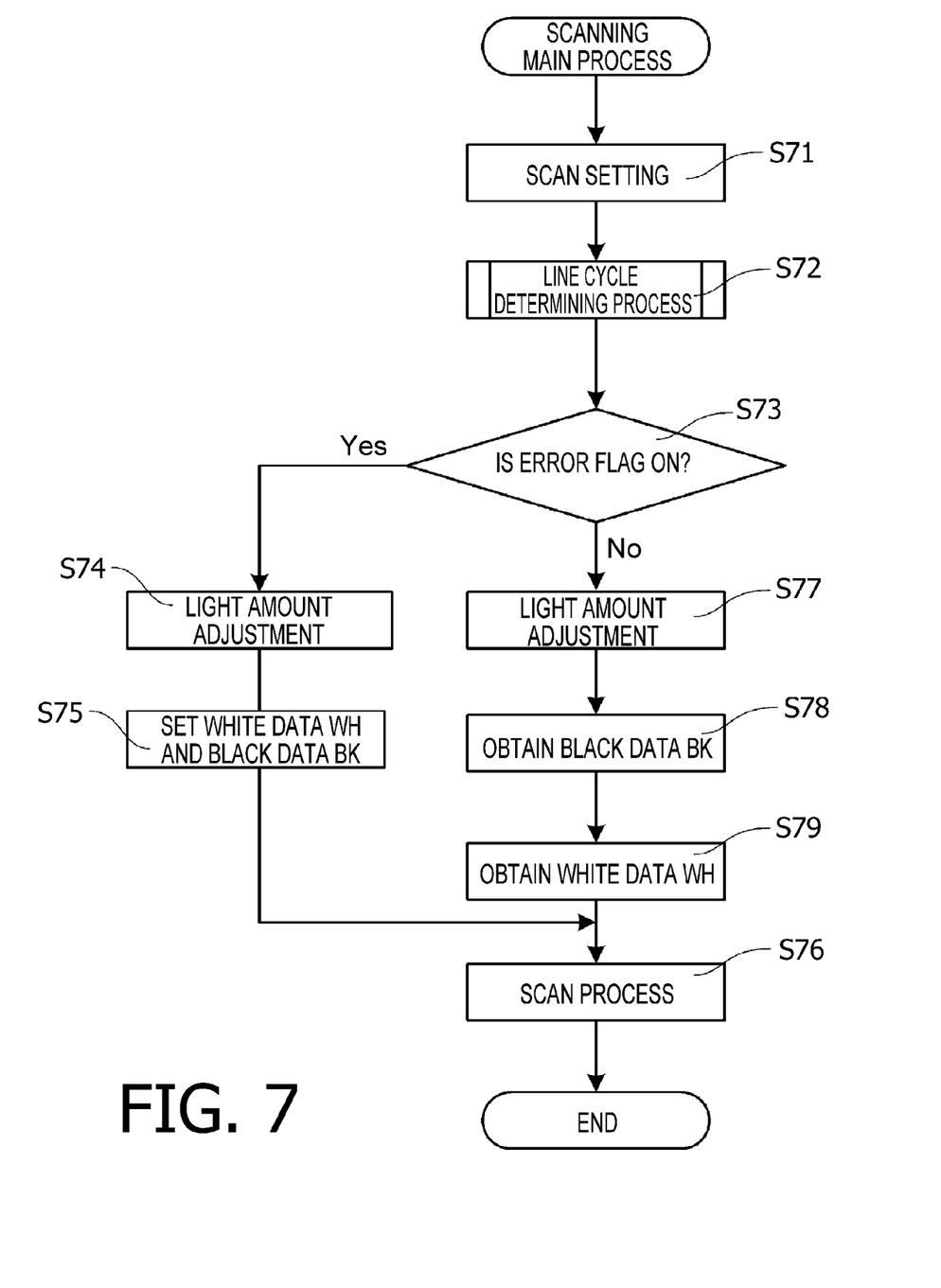
FIG. 7 is a flowchart illustrating a scanning main process according to the illustrative embodiment of the disclosures.

Referring to flowcharts, an operation of the image scanning apparatus 1 will be described. The image scanning apparatus 1 mainly executes a maintenance main process which is executed prior to scanning of original sheets GS and a scanning main process in which the original sheets GS area scanned. It is noted that steps S61-S68 of the maintenance main process, and steps S71-S79 of the scanning main process are executed by the CPU 40.

<Maintenance Main Process>

The maintenance main process shown in FIG. 6 is executed before the image scanning apparatus 1 is shipped from a factory, or when a service person performs a maintenance operation of the image scanning apparatus 1 after it was shipped. The maintenance main process is started when the service person or the like operates the operation panel 5 of the image scanning apparatus 1 according to a particular operation procedure.

The CPU 40 sets scan setting values for the device controller 44, the AFE 45 and the image processor 46 (S61). Specifically, the CPU 40 obtains setting values of a clock signal CLK and a serial-in signal SI from the flash PROM 43, and sets the same to the device controller 44. Further, the CPU 40 obtains an offset value, a gain adjustment value and a sampling value of the AFE 45 from the flash PROM 43 and sets the same to the AFE 45. The setting value of the clock signal CLK is a setting value for transmitting a signal of one pixel of the shift register included in the light reception element 31. Thus, the setting value of the clock signal CLK is a value corresponding to an output speed for one pixel of the analog signal which is output by the light reception element 31. The sampling value is a value indicating a timing at which the analog signal is converted to the digital signal, and is set for each pixel. According to the illustrative embodiment, the sampling cycle is set to 250 ns, and the pixel cycle is set to 250 ns. The offset adjustment value is a value to shift a level of the analog signal input to the AFE 45, and the gain adjustment value is a value used to adjust a gain of the analog signal input to the AFE 45. The CPU 40 does not make the image processor 46 execute a shading compensation, but causes the image processor 46 to store the digital image data in the RAM 42.

The CPU 40 determines a line cycle (S62). That is, the CPU 40 obtains black data BK with the light source 30 being turned off (FIG. 8: S801). Then, the CPU 40 calculates an extreme value EP of the black data BK (S802). The CPU 40 calculates ripple interval RPI based on a distance between extreme values (S807). Further, the CPU 40 calculates the line cycle LP such that the line cycle is an integer multiple of the ripple interval RPI (S808). When the line cycle LP is determined (S812: NO; S823: NO), the CPU 40 sets an error flag to OFF, while when the line cycle has not been determined (S823: YES), the CPU 40 set the error flag to ON.

The CPU 40 determines whether the error flag is ON or not (S63). When it is determined that the error flag is OFF (S63: NO), the CPU 40 sets the line cycle LP which is determined in S62 and proceeds to a step of a light amount adjustment (S65). When it is determined that the error flag is ON (S63: YES), the CPU 40 proceeds to a step of an error display (S64). In S64, the CPU 40 causes the display 6 to display an error indication. When the error indication is displayed, the maintenance main process is terminated.

In S65, the CPU 40 adjusts light amount of the light source 30. That is, the CPU 40 causes the light source 30 to emit light toward the white reference plate 34, and adjusts the light amount ST so that the analog signal corresponding to the reflected light becomes the maximum value of the AFE 45. It is noted that the light amount ST is determined based on a lighting cycle and a current value of the light source 30 for one line.

Next, the CPU 40 obtains the black data BK (S66). That is, the CPU 40 turns off the light source 30 and reads the whit reference plate 34. Then, the CPU 40 obtains the digital image data for one line as the black data BK, and stores the thus obtained black data BK in the flash PROM 43.

Next, the CPU 40 obtains the white data WH (S67). That is, the CPU 40 turns on the light source 30 at the light amount ST and reads the whit reference plate 34. Then, the CPU 40 obtains the digital image data for one line as the white data WH, and stores the thus obtained white data WH in the flash PROM 43.

Then, the CPU 40 stores the line cycle LP, which is determined in the line cycle determining process (S62), in the flash PROM 43 (S68). When S68 is executed, the maintenance main process is terminated.

<Scanning Main Process>

The scanning main process shown in FIG. 7 is started when the user places the original sheets GS for scanning on the sheet feed tray 2 and operates a scanning start button on the operation panel 5.

When the user operates the scanning start button, the CPU 40 sets the scan setting values (S71). That is, the CPU 40 sets the scan setting values for the device controller 44, the AFE 45 and the image processor 46. Similar to S61 of the maintenance main process, the CPU 40 obtains setting values of a clock signal CLK and a serial-in signal SI from the flash PROM 43, and sets the same to the device controller 44. Further, the CPU 40 sets the offset adjustment value, the gain adjustment value and the sampling values of the AFE 45. Further, the CPU 40 does not make the image processor 46 execute a shading compensation, but causes the image processor 46 to store the digital image data in the RAM 42.

Next, the CPU 40 determines the line cycle (S72). Similar to S62 of the maintenance main process shown in FIG. 6, the CPU 40 obtains the black data BK with turning off the light source 30 (S801). Then, the CPU 40 calculates the extreme value EP of the black data BK (S802). Next, the CPU 40 calculates the ripple interval based on an interval of the extreme values (S807). Then, the CPU 40 calculates the line cycle LP so as to be an integer multiple of the ripple interval RPI (S808). When the line cycle is determined (S812: NO, S823: NO), the CPU 40 sets the error flag to OFF, while when the line cycle has not be determined (S823: YES), the CPU 40 sets the error flag to ON.

In S73 of FIG. 7, the CPU 40 determines whether the error flag is set to ON. When it is determined that the error flag is set to OFF (S73: NO), the CPU 40 sets the line cycle LP, which is determined in S72, and proceeds to a step of light amount adjustment (S77). When it is determined that the error flag is ON (S73: YES), the CPU 40 sets the line cycle LP, which is stored in S68 of the maintenance main process (FIG. 6), and proceeds to a step of light amount adjustment (S74).

In S74, the CPU 40 adjusts the light amount of the light source 30. Specifically, the CPU 40 causes the light source 30 to emit light toward the white reference plate 34, and adjusts the light amount ST so that the analog signal corresponding to the reflected light becomes the maximum value of the AFE 45. It is noted that the light amount ST is determined based on a lighting cycle and a current value of the light source 30 for one line.

The CPU 40 sets the white data WH and the black data BK to the image processor 46 (S75). That is, the CPU 40 sets the black data BK and the white data which have been stored respectively in the flash PROM 43 in S76 and S77 of the maintenance main process to the image processor 46.

In S76, the CPU 40 executes the scan process. That is, the CPU 40 causes the image process 46 to execute shading compensation, and store the gradation values in the RAM 42. Further, the CPU 40 scans the original sheet GS, and stores the gradation values which are obtained by the shading compensation based on the black data BK and the white data WH in the RAM 42. After execution of S76, the scanning main process is terminated.

In S77, the CPU 40 adjusts the light amount of the light source 30. Specifically, similar to S74, the CPU 40 causes the light source 30 to emit light toward the white reference plate 34, and adjusts the light amount ST so that the analog signal corresponding to the reflected light becomes the maximum value of the AFE 45. It is noted that the light amount ST is determined based on a lighting cycle and a current value of the light source 30 for one line Next, the CPU 40 obtains the black data BK (S78). That is, the CPU 40 turns off the light source 30 and reads the whit reference plate 34. Then, the CPU 40 obtains the digital image data for one line as the black data BK, and sets the thus obtained black data BK to the image processor 46.

Next, the CPU 40 obtains the white data WH (S79). That is, the CPU 40 turns on the light source 30 at the light amount ST and reads the whit reference plate 34. Then, the CPU 40 obtains the digital image data for one line as the white data WH, and sets the thus obtained white data WH to the image processor 46. After execution of S79, the CPU 40 proceeds to S76.

<Determination of Line Cycle>

Figure 8:
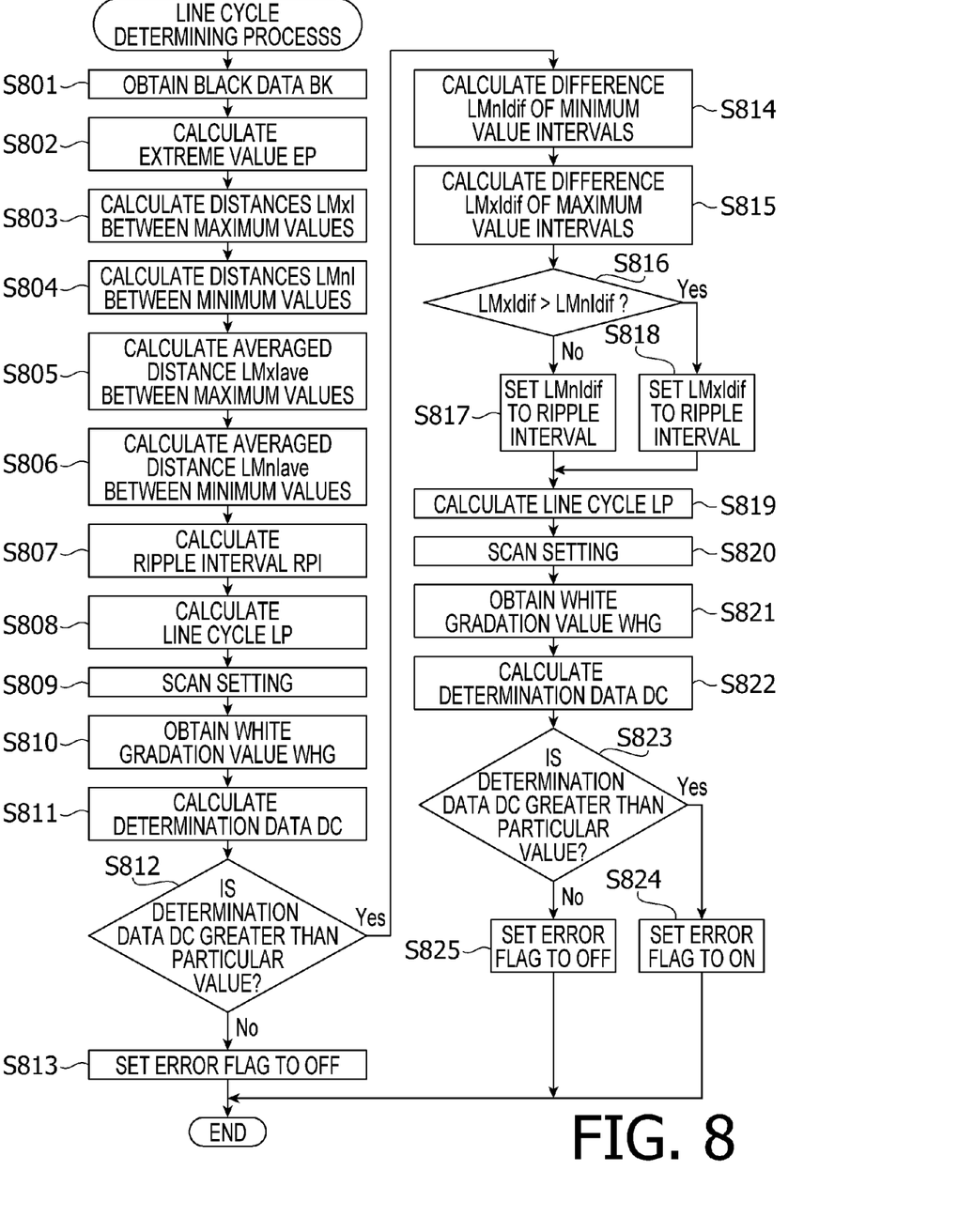
FIG. 8 is a flowchart illustrating a line cycle determining process according to the illustrative embodiment of the disclosures.

It is noted that the line cycle determining processes in S62 of FIG. 6 and S72 in FIG. 7 are the same process, and will be described referring to FIG. 8.

When the line cycle determining process (S62, S72) is started, the CPU 40 obtains the black data BK (S801). That is, the CPU 40 turns off the light source 30 and reads the white reference plate 34. Then, the CPU 40 reads the same line by 32 times to obtain 32 lines of digital image data, and averages the obtained image data for each pixel of the line. Then, the resultant data for one line, of which each pixel is represented by averaged value, is obtained as the black data BK, which is stored in the RAM 42. Since the black data BK is based on the digital image data to which the shading compensation has not been applied, the ripple voltage superposed on the analog signal can be distinguished from the black data BK. Further, since the black data BK is obtained by averaging 32 pieces of the digital image data, random noise superposed on each piece of the digital image data can be cancelled.

In S802, the CPU 40 calculates the extreme values EP. That is, the CPU 40 calculates, within one line of the black data BK, the maximum value LMx and the minimum value LMn. Then, the CPU 40 stores the maximum value LMx and the minimum value LMn in association with pixel positions respectively representing positions of the pixels exhibiting the maximum and minimum values LMx and LMn in the RAM 42.

Next, the CPU 40 calculates distance LMxI between adjacent maximum values (S803). That is, the CPU 40 calculates a distance between each of two pixels exhibiting two adjacent maximum values as the maximum value intervals LMxI, and stores the maximum value intervals LMxI in the RAM 42.

Next, the CPU 40 calculates distance LMnI between adjacent minimum values (S804). That is, the CPU 40 calculates a distance between each of two pixels exhibiting two adjacent minimum values as the minimum value intervals LMnI, and stores the maximum value intervals LMnI in the RAM 42.

Next, the CPU 40 calculates an average of the maximum value intervals LMxI (hereinafter, referred to as an averaged distance LMxIave) in S805. That is, the CPU 40 averages all the maximum value intervals LMxI to obtain the averaged distance LMxIave.

Next, the CPU 40 calculates an average of the minimum value intervals LMnI (hereinafter, referred to as an averaged distance LMnIave) in S806. That is, the CPU 40 averages all the minimum value intervals LMnI to obtain the averaged distance LMnIave.

Next, the CPU 40 calculates the ripple interval RPI (S807). That is, the CPU 40 calculates an average value of the averaged distances LMxIave and LMnIave, and stores the thus obtained averaged value as the ripple interval RPI in the RAM 42.

In S808, the CPU 40 calculates the line cycle LP. That is, the CPU 40 calculates the line cycle LP so as to be an integer multiple of the ripple interval RPI. The thus calculated line interval LP is stored in the RAM 42.

Next, the CPU 40 sets the scan setting values (S809). That is, the CPU 40 sets the scan setting values to the device controller 44 and the image processor 46. The CPU 40 sets the serial in signal SI such that the cycle of the serial in signal SI is equal to the line interval LP stored in S808. Further, the CPU 40 executes a setting to cause the image processor 46 to execute the shading compensation and store the gradation value in the RAM 42.

In S810, the CPU 40 obtains the white gradation value WHG. That is, the CPU 40 causes the light source 30 to emit light of which amount is ST, and reads the white reference plate 34 thirty-two times. Then, the CPU 40 obtains the gradation values for thirty-two pieces data for one line as the white gradation values WHG and stores the thus obtained white gradation data WHG in the RAM 42.

Next, the CPU 40 calculates determination data DC (S811). That is, the CPU 40 calculates the determination data DC by subtracting a minimum value of 32 gradation values from a maximum value of 32 gradation values for each pixel based on the white gradation values WHG consisting of 32 pieces of gradation data for one line.

In S812, the CPU 40 determines whether the determination data DC has a value greater than a particular vale. When the determination data DC includes a value which is greater than the particular value (S812: YES), the CPU 40 proceeds to S814. When it is determined that the determination data DC includes only values equal to or less than the particular value (S812: NO), the CPU 40 establishes the line cycle LP calculated in S808 and proceeds to S813, at which the CPU 40 sets the error flag to OFF. After execution of S813, the CPU 40 makes a setting to store the digital image data in the RAM 42 without making the image processor 46 execute the shading compensation, and terminates the line interval determining process (S62, S72). According to the illustrative embodiment, the particular value is 3% of the resolution 1024 for black/white color. Since the particular value is 3% of the black/white resolution, influence of the ripple voltage on the scanned image can be suppressed.

The CPU 40 calculates a difference LMnIdif of the minimum value intervals (hereinafter, referred to as the minimum value interval difference LMnIdif) in S814. Specifically, the CPU 40 obtains the minimum value interval difference LMnIdif by subtracting the minimum value of the minimum value intervals LMnI from the maximum value of the minimum value intervals LMnI. The CPU 40 stores the thus obtained minimum value interval difference LMnIdif in the RAM 42.

The CPU 40 calculates a difference LMxIdif of the maximum value intervals (hereinafter, referred to as the maximum value interval difference LMxIdif) in S815. Specifically, the CPU 40 obtains the maximum value interval difference LMxIdif by subtracting the minimum value of the maximum value intervals LMxI from the maximum value of the maximum value intervals LMxI. The CPU 40 stores the thus obtained maximum value interval difference LMxIdif in the RAM 42.

In S816, the CPU 40 determines whether the maximum value interval difference LMxIdif is greater than the minimum value interval difference LMnIdif. When it is determined that the maximum value interval difference LMxIdif is greater than the minimum value interval difference LMnIdif (S816: YES), the CPU 40 sets the averaged minimum value interval LMnIave to the ripple interval RPI (S818).

In S817, the CPU 40 sets the average maximum value interval LMxIave to the ripple interval RPI. That is, the CPU 40 stores the average maximum value interval LMxIave in the RAM 42 as the ripple interval RPI.

In S818, the CPU 40 sets the average minimum value interval LMnIave to the ripple interval RPI. That is, the CPU 40 stores the average minimum value interval LMnIave in the RAM 42 as the ripple interval RPI.

It is noted that steps S819-S822 are similar to S808-S811. That is, calculation of the line cycle LP (S819), scan setting (S820), obtaining of the white gradation value WHG (S821) and calculation of the determination data DC (S822) are executed similarly to the line cycle LP (S808), scan setting (S809), obtaining of the white gradation value WHG (S810) and calculation of the determination data DC (S811). After execution of S822, the CPU 40 proceeds to S823, where the CPU 40 determines whether the determination data DC is greater than the particular value.

In S823, the CPU 40 determines whether the determination data DC is greater than the particular value. When there is a pixel of which determination data DC is greater than the particular value (S823: YES), the CPU 40 proceeds to S824 without establishing the line cycle LP. In S824, the CPU 40 sets the error flag to ON. When there are only pixels of which determination data DC is equal to or less than the particular value (S823: NO), the CPU 40 establishes the line cycle LP which is calculated in S819, and proceeds to S825. In S825, the CPU 40 sets the error flag to OFF. After execution of S824 or S825, the CPU 40 makes settings to store the digital image data in the RAM 42 without making the image processor 46 execute the shading compensation, and terminates the line cycle determining process (S62, S72).

Effects of Illustrative Embodiment

According to the illustrative embodiment, the image scanning apparatus is designed such that the pixel cycle IPT is the integer multiple of the switching cycle SWT. Accordingly, at the sampling points of the analog signal, the fluctuation of the ripple voltage is substantially constant. In other words, the fluctuation of the ripple voltage is substantially constant for anyone of the pixels.

According to the illustrative embodiment, in the line cycle determination process (S62, S72), based on the black data BK obtained in the black data obtaining step (S801), the CPU 40 obtains the maximum values LMx and the minimum values LMn in the extreme value EP calculating step (S802). Further, the CPU 40 calculates the maximum value intervals LMxI and the minimum value intervals LMnI (S803 and S804), then the average maximum value interval LMxIave and the average minimum value interval LMnIave (S805 and S806). Thereafter, the CPU 40 calculates an average value of the average maximum value interval LMxIave and the average minimum value interval LMnIave as the ripple interval RPI, and then, the CPU 40 calculates the line cycle LP so as to be the integer multiple of the ripple interval RPI (S808). With this configuration, it is possible that the fluctuation of the ripple voltage of each pixel in one line is substantially constant.

According to the illustrative embodiment, when it is determined that the maximum value interval difference LMxIdif is greater than the minimum value interval difference LMnIdif, the average minimum value interval LMnIave is set to the ripple interval RPI, while the maximum value interval difference LMxIdif is equal to or less than the minimum value interval difference LMnIdif, the average maximum value interval LMxIave is set to the ripple interval RPI. Since the ripple interval RPI is calculated based on the maximum values LMx or the minimum values having less fluctuation, the ripple interval can be set to well match a fluctuation cycle of the ripple voltage.

According to the illustrative embodiment, the CPU 40 sets the line cycle LP which is calculated in S809 and S820, obtains the white gradation value WHG in S810 and S821, and calculates the determination data DC based on the white gradation value WHG in S811 and S822. Further, in S812, S823, S813, S825 and S824, when it is determined that the determination data DC is greater than the particular value, the error flag is set to ON, while when it is determined that the determination data DC is equal to or less than the particular value, the error flag is set to OFF. Therefore, the line cycle LP is determined precisely.

Modifications

It is noted that aspects of the disclosures should not be limited to the configuration of the above-described illustrative embodiment, but various modifications could be made without departing from the aspects. Some examples of such a modification will be described below.

(1) The image scanning apparatus 1 according to the illustrative embodiment may be applied to an MFP (multi-function peripheral) which is provided with a printer. The illustrative embodiment is described such that the power source of the scanner 24 is a DC 3.3 V power source. This can be modified to another DC power source. Further, the power source of the scanner 24 may be configured to supply power to another circuit in addition to the scanner 24.

(2) The illustrative embodiment is described mainly based on the image scanning apparatus which is designed in accordance with the design example 3. It should be noted that, in the image scanning apparatus designed in accordance with the design example 1, it is possible to calculate the extreme values of the black data for each pixel within one line, calculate intervals between pixels exhibiting the extreme values as extreme value intervals, calculate the ripple intervals based on the calculated extreme value intervals, and calculate the line cycle LP such that the line cycle LP is an integer multiple of a value that is the calculated ripple interval multiplied by the pixel cycle. Determining the line cycle LP as above, the fluctuation of the ripple voltage for each pixel of each line.

(3) In the above-described illustrative embodiment, the line cycle LP is determined based on the black data BK (S62, S72), this determination may be made based on data of intermediate color. Alternatively, the line cycle LP may be determined based on the voltage of the power source for the scanner 24.

(4) In the above-described illustrative embodiment, the determination data is calculated using the white gradation value WHG in S811 or S822. This process may be modified to use gradation value of the intermediate color such as gray.

(5) In the above-described embodiment, the extreme values of the black data BK are calculated, and then the ripple interval is calculated. This process may be modified such that a fluctuation of the ripple voltage the ripple interval is calculated

What is claimed is:

1. An image scanning apparatus, comprising:
a scanner configured to read an original sheet on a line basis at a constant line cycle and generate analog image data for each pixel of the line, and output the analog image data for each pixel at a pixel cycle;
a power source including a DC/DC convertor which is configured to convert a first DC voltage to a second DC voltage by applying a switching control to the first DC voltage at a switching cycle, the second DC voltage being supplied to the scanner;
a convertor configured to sample the analog image data at the pixel cycle to convert the analog image data to digital image data;
a sampling setting unit configured to set the pixel cycle;
a light source configured to illuminate the original sheet; and
a controller configured to:
cause the sampling setting unit to set the pixel cycle such that the pixel cycle is an integer multiple of the switching cycle of the DC/DC convertor;
obtain black data of each pixel within the one line, which is output by the convertor when the light source is turned off;
calculate extreme values for each pixel within the line based on the black data, and calculate an interval between every two of the pixels exhibiting the extreme values as extreme value intervals;
calculate a ripple interval based on the extreme value intervals, the ripple interval representing an interval of a periodical fluctuation superposed on the analog image data; and
calculate the line cycle such that the line cycle is an integer multiple of the ripple interval multiplied by the pixel cycle.

2. The image scanning apparatus according to claim 1, wherein the controller further configured to
calculate maximum vales of the black data for each pixel within the one line;
calculate intervals between positions of the pixels exhibiting the maximum values as maximum value intervals;
calculate minimum values of the black data for each pixel within the one line; and
calculate intervals between positions of the pixels exhibiting the minimum values as minimum value intervals,
wherein the controller further configured to:
calculate an average of the intervals of the maximum values as an average maximum value interval;
calculate an average of the intervals of the minimum values as an average minimum value interval; and
calculate an average of the average maximum value interval and the average minimum value interval as the ripple interval.

3. The image scanning apparatus according to claim 1, wherein the controller is further configured to:
calculate the maximum values of the black data for respective pixels within the one line;
calculate the intervals between the positions of the pixels exhibiting the maximum values as maximum value intervals;
calculate an average of the maximum value intervals as an average maximum value interval; and
determine the average maximum value interval as the ripple interval.

4. The image scanning apparatus according to claim 1, wherein the controller is further configured to:
calculate minimum values of the black data for respective pixels within the one line;
calculate the intervals between the positions of the pixels exhibiting the minimum values as minimum value intervals;
calculate an average of the minimum value intervals as an average minimum value interval; and determine the average minimum value interval as the ripple interval.

5. The image scanning apparatus according to claim 1, wherein the controller is further configured to:
calculate maximum values of the black data for respective pixels within the one line;
calculate intervals of the positions of the pixels exhibiting the maximum values as the maximum value intervals;
calculate minimum values of the black data for respective pixels within the one line;
calculate intervals of the positions of the pixels exhibiting the minimum values as the minimum value intervals;
calculate a maximum interval difference by subtracting a minimum value of the maximum value intervals from a maximum value of the maximum value intervals;
calculate a minimum interval difference by subtracting a minimum value of the minimum value intervals from a maximum value of the minimum value intervals;
determines one of the average minimum value interval and the average maximum value interval corresponding to smaller one of the maximum value interval difference and the minimum value interval difference as the ripple interval.

6. The image scanning apparatus according to claim 1, further comprising:
a line setting unit configured to set a line to be read by the scanner;
a reference plate arranged at a position facing the scanner; and
a compensation unit configured to apply shading compensation to the digital image data to output gradation values,
wherein the controller is configured to:
obtain, by multiple times, white gradation values of respective pixels within one line of image data output by the compensation unit with the light source being turned on;
calculate determination data which is a difference obtained by subtracting a minimum value of the white gradation values from a maximum value of the white gradation values;
determine the line cycle based on the determination data; and
set the line cycle to the line setting unit.

7. The image scanning apparatus according to claim 6, wherein the controller determines the line cycle when the determination data represents a value equal to or less than a particular value, and
wherein the controller does not determine the line cycle when the determination data represents a value greater than the particular value.

8. The image scanning apparatus according to claim 7, wherein the controller is configured to calculate the determination data before a pre-scan process and during the pre-scan process, and
wherein, when the determination data obtained before the pre-scan process is greater than the particular value, the controller does not determine the line cycle and causes the image scanning apparatus to make an error notification.

9. The image scanning apparatus according to claim 8, further comprising a storage,
wherein the controller is configured to calculate the determination data before a pre-scan process and during the pre-scan process,
wherein, when the determination data obtained before the pre-scan process is equal to or less than the particular value, the controller establishes the line cycle and stores the established line cycle in the storage as a prior line cycle,
wherein, when the determination data obtained during the pre-scan process is greater than the particular value, the controller does not establish the line cycle, but sets the prior line cycle to the scanner.

* * * * *